United States Patent [19]

Desmond et al.

[11] Patent Number: 4,718,671

[45] Date of Patent: Jan. 12, 1988

[54] TELESCOPICALLY ADJUSTABLE GAME CUE

[75] Inventors: Peter A. Desmond, Ilfracombe; James S. Rich, Berynarbour, both of England

[73] Assignee: Tele-Cue Limited, North Devon, England

[21] Appl. No.: 835,286

[22] Filed: Mar. 3, 1986

[30] Foreign Application Priority Data

Mar. 2, 1985 [GB] United Kingdom ............... 8505406
May 10, 1985 [GB] United Kingdom ............... 8511831
Sep. 6, 1985 [GB] United Kingdom ............... 8522200

[51] Int. Cl.$^4$ .............................................. A63D 15/08
[52] U.S. Cl. ................................... 273/68; 273/DIG. 6
[58] Field of Search ............... 273/80 D, 68, 69; 403/104, 110, 371, 290; 280/823

[56] References Cited

U.S. PATENT DOCUMENTS

| | | | |
|---|---|---|---|
| 3,009,747 | 11/1961 | Pitzer | 403/371 |
| 3,711,093 | 1/1973 | Evans . | |
| 3,740,034 | 7/1973 | Scroggins . | |
| 3,858,882 | 1/1975 | Fox et al. . | |
| 3,931,968 | 1/1976 | Hedberg . | |
| 4,134,588 | 1/1979 | Di Luzio . | |
| 4,134,703 | 1/1979 | Hinners | 403/104 |

FOREIGN PATENT DOCUMENTS

| | | | |
|---|---|---|---|
| 2489162 | 3/1982 | France | 273/68 |
| 608370 | 9/1948 | United Kingdom . | |
| 2071194 | 9/1981 | United Kingdom . | |

*Primary Examiner*—Richard C. Pinkham
*Assistant Examiner*—Matthew L. Schneider
*Attorney, Agent, or Firm*—Cushman, Darby & Cushman

[57] ABSTRACT

A telescopic cue for billiards, pool, snooker and the like includes telescopically engaged central and butt sections permitting infinite adjustment of cue length between two end positions and a lock for securing the central and butt sections by frictional engagement at any selected cue length. The frictional engagement is provided by a member on one of the butt and central sections arranged for radial expansion or contraction to engage frictionally the other of the butt and central sections to prevent relative axial movement of the butt and central sections. The member may comprise a collet disposed between two relatively movable abutments which are urged towards one another on relative rotation of the butt and central sections or two parts of the same section to expand or contract the member to provide the aforesaid frictional engagement.

10 Claims, 28 Drawing Figures

TELESCOPICALLY ADJUSTABLE GAME CUE

BACKGROUND OF THE INVENTION

This invention relates to improvements to cues as use in the games of billiards, snooker, pool, bar-billiards and the like. The word "cue" in this specification is intended to encompass cues (or cue sticks) intended or adapted for use in any of these games.

Billiard cues are traditionally made of wood either in one piece or of several pieces glued or laminated together. Recently cues have been made in pieces screwed for assembly to form a cue of the length required; dismantled, the cue is then easier to transport, carry or store due to the shorter length of the individual pieces. However before use these have to be re-assembled and if during play a longer length of cue is required either an extension piece would need to be fitted or a separate longer cue obtained; the opposite of course applies if a shorter cue is required, as for instance in playing pool.

The prior art discloses cues consisting of a number of telescopically related parts. However, some of these (e.g. Scroggins U.S. Pat. No. 3,740,034) are intended to collapse or fold in a more easily transportable configuration and extend or unfold into an operation configuration for use, while others (e.g. Evans U.S. Pat. No. 3,711,093, Fox et al U.S. Pat. No. 3,858,882 and Di Luzio U.S. Pat. No. 4,134,588) are spring actuated so that the release of the energy of a spring rather than the strength of the player provides the impulse when a stroke is played. Nowhere to our knowledge does the prior art disclose a cue, the length of which is continuously adjustable but which can be locked into a length of the player's choice to play a stroke.

It is therefore an object of the invention to provide a rigid (i.e. non-spring loaded) cue of continuously adjustable lengths.

It is another object of the invention to provide a rigid cue which can be quickly and easily adjusted for length so that the player can suit the length of the cue to each stroke he plays.

It is a further object of the invention to provide an adjustable cue which can be locked by relative rotation of two co-axial parts without the need for any key or button.

Still further objects of the invention will become apparent to the skilled reader from a perusal of the following specification, drawings, and claims.

SUMMARY OF THE INVENTION

Our cue according to the invention differs from existing forms of cues in that the means of altering or adjusting the desired length of the cue according to the shot to be played are available without the need to fit an extension piece or use an additional separate cue. The cue according to the invention has a self-contained means to enable the user to instantly alter and adjust the overall length of the cue as desired. A range of materials other than the traditional wood can be used in its construction offering a variety of designs and finishes.

This invention contemplates a cue, the length of which is continuously telescopically adjustable between two extremes comprising at least two co-axial sections received one within the other and a locking device to fix the relative axial positions of two sections.

In this specification, the section received in the other section is called "the received section" and vice versa.

In preferred embodiments the two co-axial sections of the cue will comprise a butt section and a central section adapted to receive a cue tip, either by threadable or by frictional engagement. The butt section may be telescopically received in the central section or vice versa.

The locking device may take a number of forms. These include external split collet devices which may be mounted on the receiving section, whether this is the butt or central section; also included are internal locking devices operatable by relative axial rotation of two coaxial parts of the cue, for example the recieved and receiving sections.

In a preferred embodiment the lock is comprised in the butt section and is axially spaced from the grip, and the central section comprises a rod slideably receivable in the coaxial bores in the lock and grip.

In one improved version, the lock is comprised in the central section rather than the butt section, and the butt section comprises a rod slideably receivable in co-axial bores in the lock and the central section.

We have discovered that this configuration gives substantial advantages of balance and handle over the configuration already described in which the lock is part of the butt section.

Also within the invention is the application of the principle of the invention to a type of prior art extension piece now in use.

One known method of extending cues when the need arises entails the use of an extension piece with a socket at one end which is a push fit over the butt end of a conventional standard length cue. The other end of the extension piece is a conventional butt. In use the extension piece is fitted over the butt end of the standard cue.

We have now discovered that the principle of a telescopically extendable cue as disclosed in our earlier application can be advantageously applied to the extension piece rather than the cue itself.

Thus we now provide a cue extension comprising a butt section including a hand grip, a central section adapted for telescopic engagement with the butt section and having a socket adapted to take by push fit the butt of a standard length cue, and a lock to fix the relative axial positions of the butt and central sections. In effect that is a telescopically extendable cue as described above, in which the means to mount the cue tip is a socket adapted to take the butt of a standard cue.

In the new cue extension described above the lock may be comprised either in the butt or in the central section.

Further, according to the present invention, we provide a telescopically extendable cue comprising a butt section and a central section, the central section having means at its outer end to receive and retain a tip, and an internal lock operable by relative rotation of the central and butt sections about their common axis or of two parts of the same section to prevent or restrain relative telescopic movement of the butt and central sections.

The cue according to the invention may be constructed either with a central section having a rearwardly extending tube or rod which is telescopically received inside the butt section, or a butt section with a forwardly extending tube or rod which is telescopically received inside the central section. According to which form is chosen, the internal lock will be mounted, respectively, either on the end of the rearwardly extending tube or rod of the central section, or on the forward end of the forwardly extending tube or rod of the butt section. In both cases the "forward" end of the cue is that which strikes the ball, and the "rear" end of the cue is that which is grasped by the player. It will be convenient throughout this description to refer to the telescopically combined sections of the cue as the "received" and "receiving" sections, it being understood that each of these may be either the butt or the central section.

According to one embodiment of the invention, the internal lock comprises a split internally bevelled collet retained between two opposed externally bevelled cones the first such cone being slidedly received but not rotatable in the receiving section of the cue and the other cone being rotatable inside the receiving section but non-rotatably mounted on the received section, the received and receiving sections being threadably engaged so that relative rotation of the received and receivable sections in one sense brings them together causing the surfaces of the cones to bear upon the internally bevelled surfaces of the collet to urge the collets outwardly against the internal surface of the receiving section and prevent or restrain relative telescopic movement of the received and receiving sections.

According to another embodiment of the invention, the lock comprises a resiliently compressible cylindrical element with external conical surfaces at its ends, the received section being slideably received in the cylindrical element which is retained between opposed internal conical faces respectively formed into threadably engaged components of the receiving section such that relative rotation of the two components brings the internal conical faces to bear on the cylindrical element compressing the cylindrical element and causing the internal face thereof to engage with the received section of the cue whereby telescopic movement of the received and receiving sections of the cue is restrained or prevented.

DESCRIPTION OF THE PREFERRED EMBODIMENTS

Figures 1, 3:
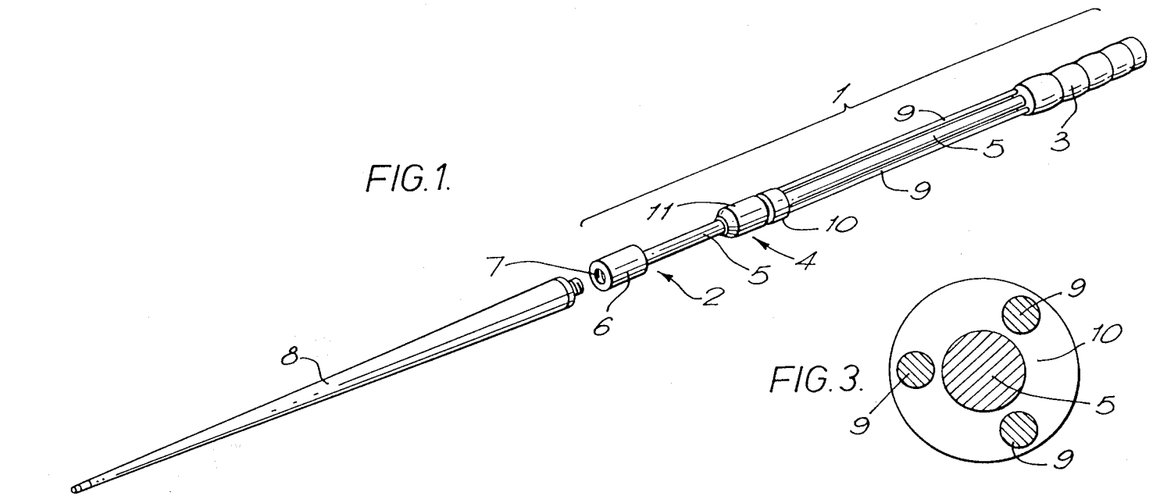
FIG. 1 is a general isometric view of a preferred embodiment.
FIG. 3 is an enlarged cross sectional view taken along the line 3—3 in FIG. 2
Figure 2:
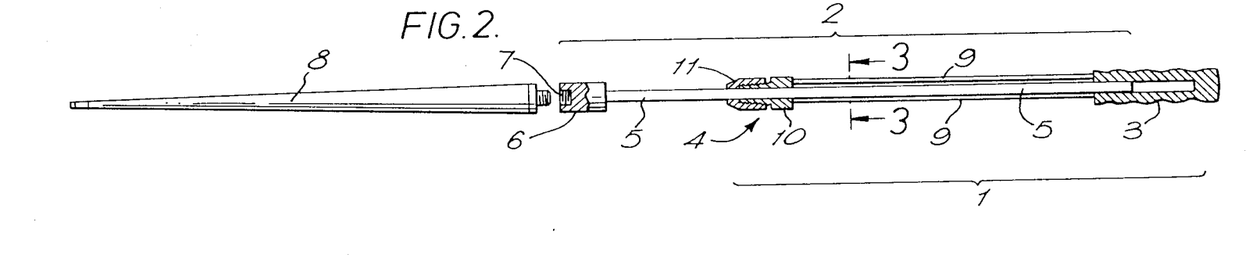
FIG. 2 is an axial sectional view of the same embodiment

The embodiment shown in the FIGS. 1 to 3 of the drawings consists of a butt section 1 in which a central section 2 is telescopically received. The butt section comprises a grip 3 and, axially spaced therefrom, a lock 4. The grip 3 and lock 4 are axially bored to receive a rod 5 forming part of the central section 2. Central section 2 comprises a generally cylindrical part 6 having a threaded socket 7 to receive the threaded end of a cue tip 8. Grip 3 is rigidly spaced apart from lock 4 in the embodiment shown by three spacing rods 9 equally spaced about and parallel to the central rod 5 (see FIG. 3). Rod 5 passes through a bore in lock 4 and into an axial cylindrical bore in grip 3. The lock 4 consists of a collet device comprising a core 10 (preferably of nylon) threadably engaged in a knurled grip 11. Knurled grip 11 is threadably mounted on core 10 and when tightened compresses core 10 to grip rod 5 securely and fix the relative axial positions of the butt and central sections.

Rod 5 must be a good sliding fit in lock 4 and grip 3.

Figure 4:
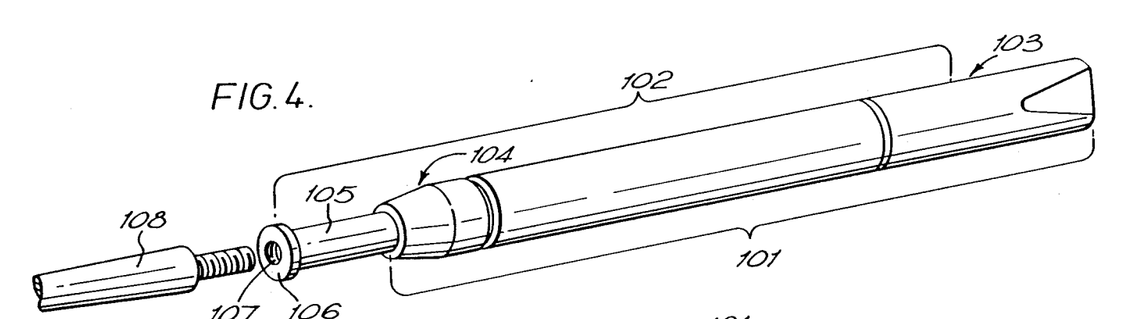
FIG. 4 is a general isometric view of a telescopically extendable cue according to the invention in which the lock is comprised in the butt section.
Figure 5:
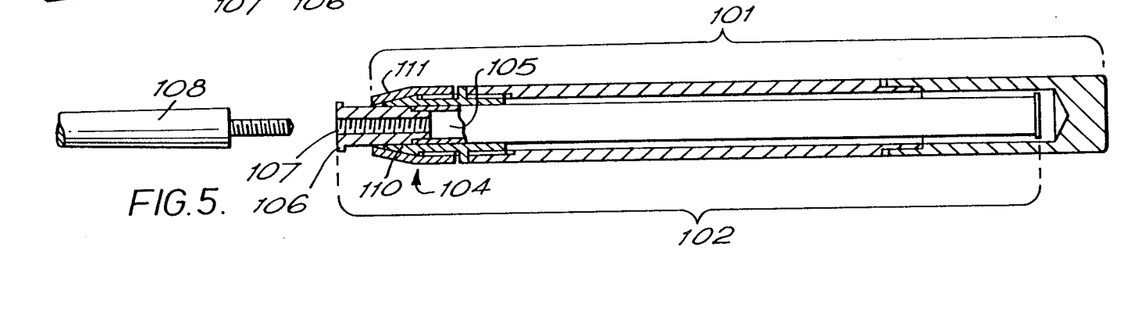
FIG. 5 is an axial sectional view of the same embodiment.

Turning now to FIGS. 4 and 5, these show another preferred embodiment of the invention.

Figures 11A, 11B:
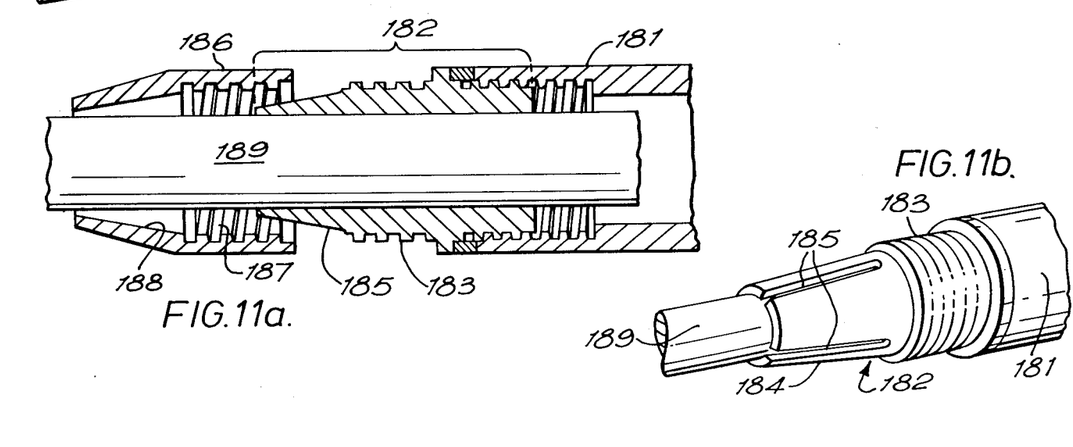
FIGS. 11a and 11b show respectively in axial cross section, and in general isometric view, the locking device preferably used according to the invention.

The embodiment shown consists of a butt section 101 in which a central section 102 is telescopically received. The butt section comprises a grip 103 and a lock 104. The grip 103 and lock 104 are axially bored to receive a cylindrical tube or rod 105 constituting the main part of the central section 102. Although this part is described herein for brevity as a rod it will be understood that a tube of similar diameter may equally well be used with a saving in weight and is within the scope of the invention. At the outer end of central section 102 is a collar or bush 106 having a threaded socket 107 to receive the threaded end of a cue tip 108. Rod 105 passes through a bore in lock 104 and into an axial cylindrical bore in grip 103. The lock 104 consists of a collet device (as shown in FIGS. 11a and 11b and described below in more detail) comprising a core 110 (preferably of nylon) threadably engaged in a grip 111. Knurled grip 111 is threadably mounted on core 110 and when tightened compresses core 110 to grip rod 105 securely and fix the relative axial positions of the butt and central sections.

Rod 105 must be a good sliding fit in lock 104 and grip 103.

Figure 6:
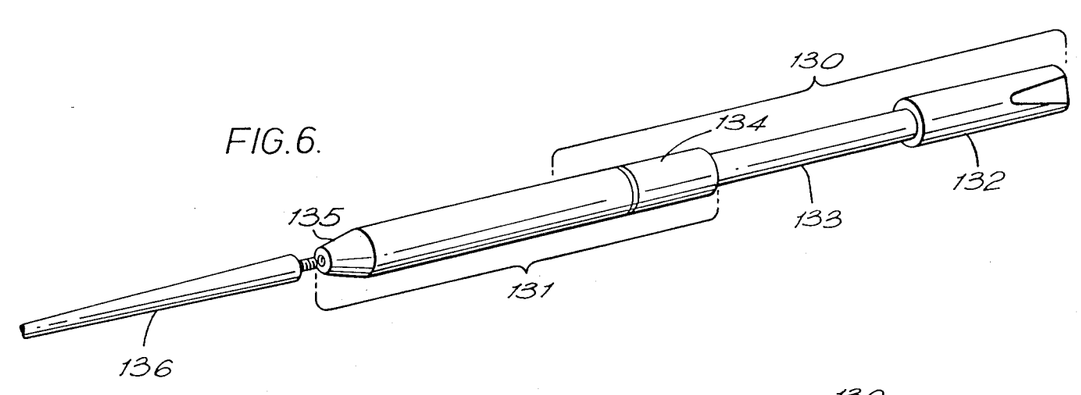
FIG. 6 is a general isometric view, corresponding to FIG. 4, of a cue according to the present invention in which the lock is comprised in the central, rather than the butt, section.
Figure 7:
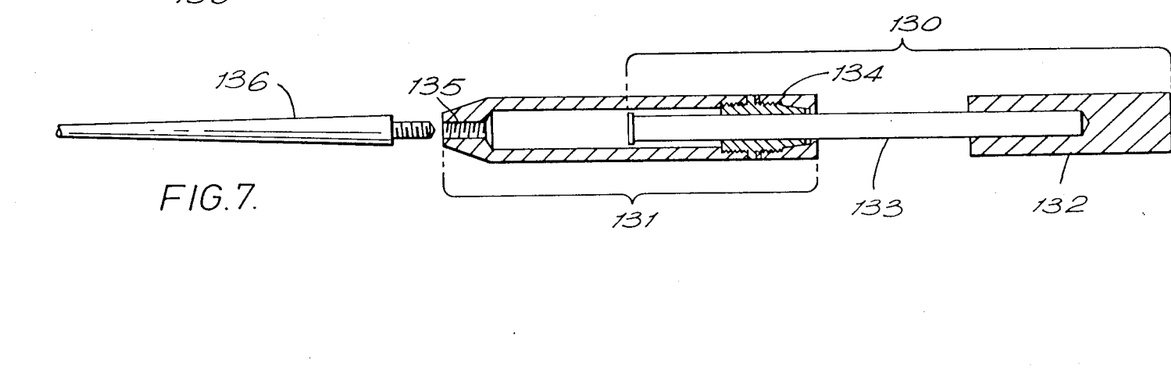
FIG. 7 is an axial sectional view, corresponding to FIG. 5, of a cue according to the present invention in which the lock is comprised in the central, rather than the butt, section.

FIGS. 6 and 7 show a preferred embodiment of a telescopic cue within the scope of our invention in which the lock is comprised in the central section rather than the butt section. In these Figures, the butt section is shown generally at 130 and the central section generally at 131. The butt section 130 comprises a grip 132 and a rod 133 slideably received in the central section 131. At the rear end of the central section 131 is a lock shown generally as 134 and at the opposite end a plug 135 tapped to receive a cue tip 136. The central part 137 of the central section is a rod or tube. The lock 134 can be of the same type as described subsequently in the present description with reference to FIGS. 11a and 11b; however in the embodiment shown in FIGS. 6 and 7 the locking ring is preferably entirely cylindrical, rather than having a frusto-conical section, so as to form a straight continuous outline when the butt and central sections are closed up.

Figure 8:
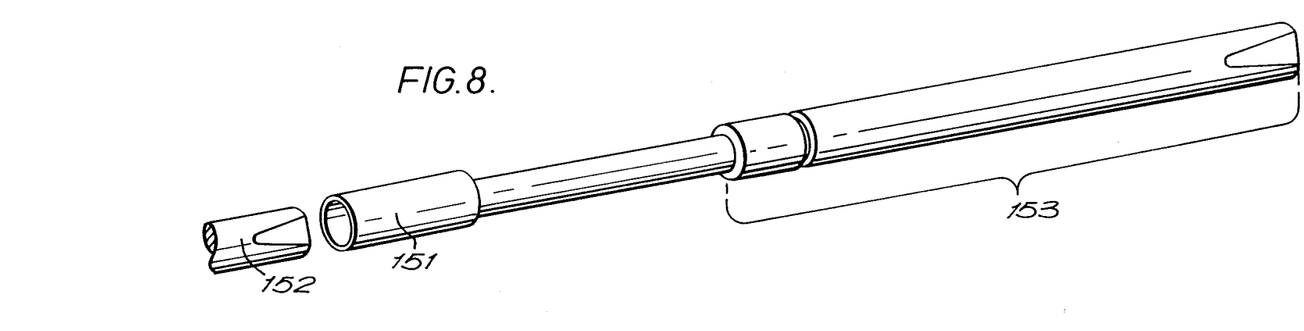
FIGS. 8 and 9 are respectively a general isometric view and an axial sectional view of a cue extension according to the present invention in which the lock is comprised in the butt section.
Figure 9:
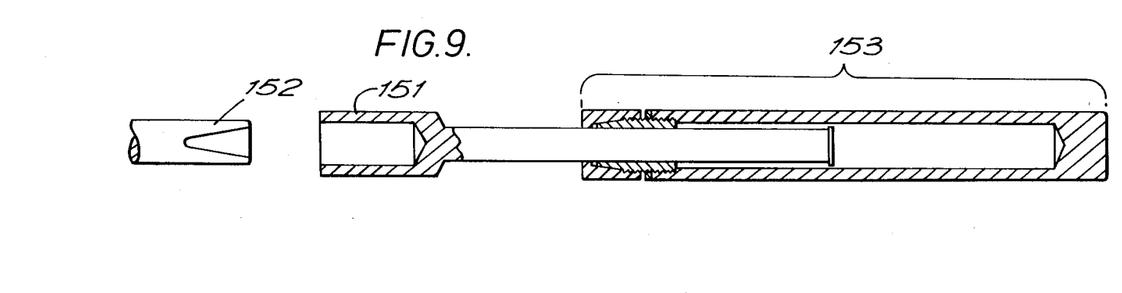

FIGS. 8 and 9 show a telescopic cue extension according to the present invention corresponding generally to that shown in FIGS. 4 and 5 but in which the tapped bush or collar 106 is replaced by a socket 151 adapted to receive and retain the butt of a cue of standard length 152. The butt section 153 of the embodiment shown in FIGS. 8 and 9 is as described above with reference to FIGS. 5 and 6 and will not be described herein in more detail. The socket 151 may be made of any suitable material the choice of which is within the capacity of those skilled in the art, but it is preferred to use a slightly flexible natural rubber or plastics material which is capable of holding and retaining the cue butt 152 by means of a push fit while giving the whole assembly, cue plus extension, sufficient regidity.

Figure 10:
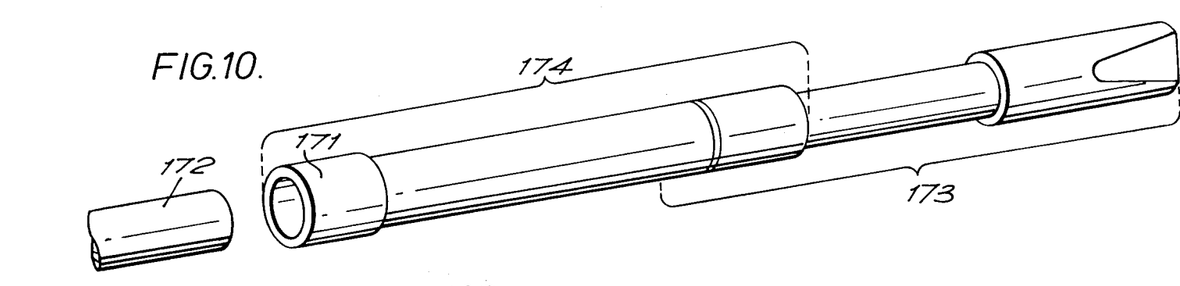
FIG. 10 is a general isometric view of a cue extension according to the present invention in which the lock is comprised in the central section.

FIG. 10 shows a modification of the extendable cue described with reference to FIGS. 6 and 7, in which the tapped bush 135 is replaced by a socket 171 adapted to receive and retain the butt of a standard cue 172. The butt section 173 and the central section 174 of this cue extension are (apart from the socket 171) similar to that described above with reference to FIGS. 8 and 9.

Although we have already stated that the locking device used is a form of the well-known collet device as used in chucks and many other applications, we describe below for the sake of completeness the particular form which this device takes in billiard cues according to preferred embodiments of the invention. Such a device is shown in axial cross-section in FIG. 11a and in an isometric view in FIG. 11b. The butt section of the cue is shown at 181 and carries co-axially therewith a core 182 formed of nylon or other resilient material. The core 182 comprises a cylindrical threaded portion 183 and a tapering frusto-conical section 184 divided by radial slots 185 which divide the conical part 184 into tongues. The lock also comprises a generally cylindrical cover 186 with a internally threaded part 187 adapted to threadably engage the threaded part 183 of the core and a frusto-conical part 188 dimensioned to bear on the tongues. When the cylindrical part 186 is engaged with the core 182 and tightened the tongues are forced against the rod or tube 189 received in the lock and axial movement of the rod or tube 189 in the grip 181 is prevented.

Figure 12A:
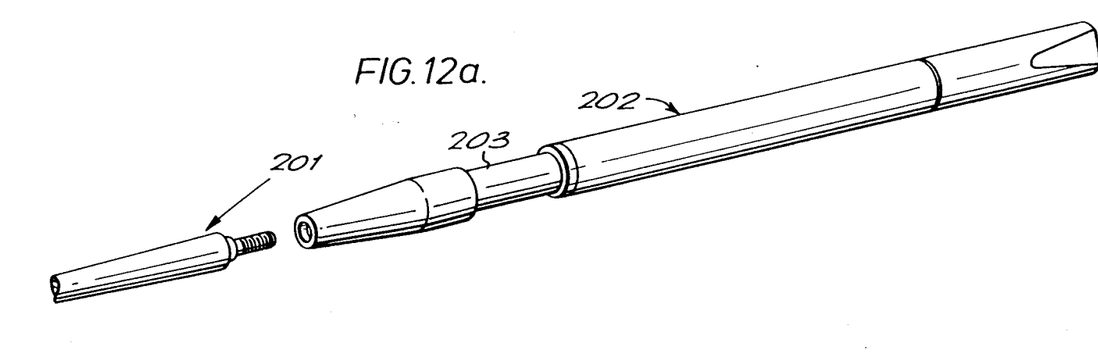
FIGS. 12a to 12f show one form of an embodiment described in general terms above, in which the lock comprises an outwardly expanding split collet mounted on the rearward end of the central section, which is in this instance the received section.
Figure 12B:
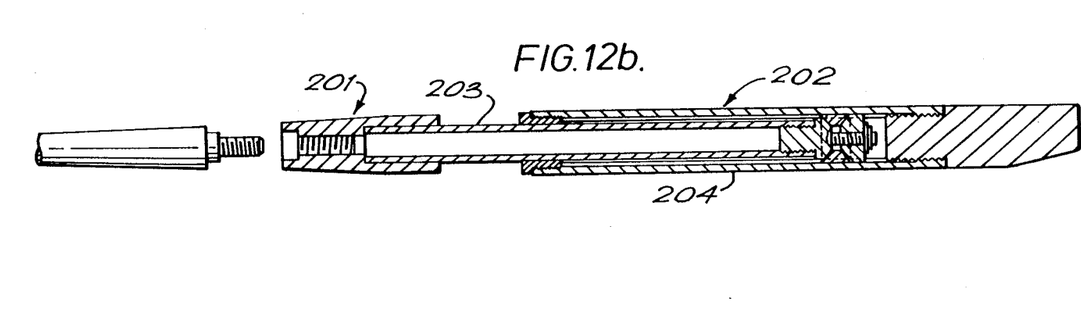
Figure 12C:
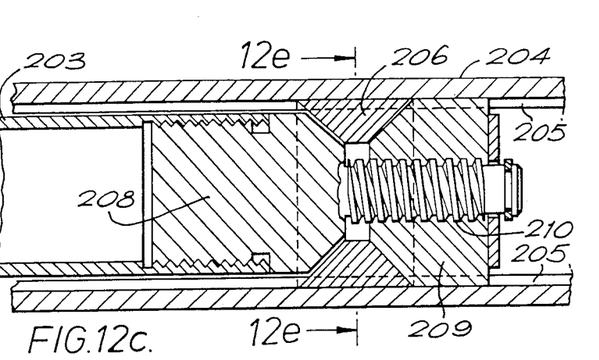
Figure 12D:
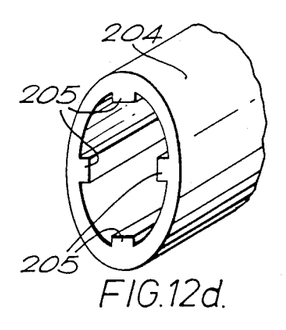

Turning now to the embodiment shown in FIGS. 12a to 12e, the cue is shown generally in isometric view in FIG. 12a; the central section shown generally at 201 is received inside the butt section shown generally at 202. The whole of the central and butt sections is shown in axial cross section in FIG. 12b; the lock is shown in similar view, but greatly enlarged, in FIG. 12c and in cross section along the line A—A, in FIG. 12e. FIG. 12d shows the splines formed on the inside of the butt section tube 204.

As can be seen from FIG. 12b, central section 201 comprises a tube 203 extending into a tube 204 which forms the forward portion of the butt section 202. At the rearward end of the tube 203 is a lock shown generally in FIG. 12b and in greater detail in FIGS. 12c and 12d. This tube 204 is formed with internal longitudinal splines 205 which engage the circumference of an internally bevelled split collet 206 shown separately in FIG. 12f. This collet is preferably formed of a resilient plastics material such as nylon and is axially slotted from each end, the slots extending from each end being at right angles to each other, in known manner, to give the collet resilient compressibility. The tube 203 ends in a cone 208 the conical surfaces of which bear against the bevelled surfaces of the collet 206. On the other side of the collet 206 is a sliding member 209 with conical faces bearing on the other end of the collet 206. A threaded extension 210 of the cone 208 is threadably engaged in the slideable member 209. Slideable member 209 is engaged in the splines 205 which prevent it from rotating inside tube 204.

It will be seen that relative rotational movement of the tubes 203 and 204 will, by virtue of the engagement of the boss 210 in the slideable element 209 tend to bring the opposed faces of the conical members 208 and 209 together thus expanding the collet 206 outwardly against the internal surface of the tube 204 and restraining or preventing telescopic adjustment of the length of the cue. Thus with the conical members 208 and 209 spaced apart and exerting no pressure on the collet 206, the cue can be adjusted for length by sliding the central and butt sections 201 and 202 telescopically; when the desired length is reached a quick twist of the two sections relative to each other in the appropriate direction brings the conical members 208, 209 together, bearing on the corresponding faces of the collet 206, which is expanded outwardly against the internal surface of the tube 204, and prevents further telescopic adjustment to the length of the cue.

The telescopic cue shown in a corresponding manner in FIGS. 13a to 13e operates in a similar manner, like numerals denoting the corresponding parts, and we shall not give an exhaustive description of its mode of operation as it can be fully understood with the aid of the above description.

Figure 14A:
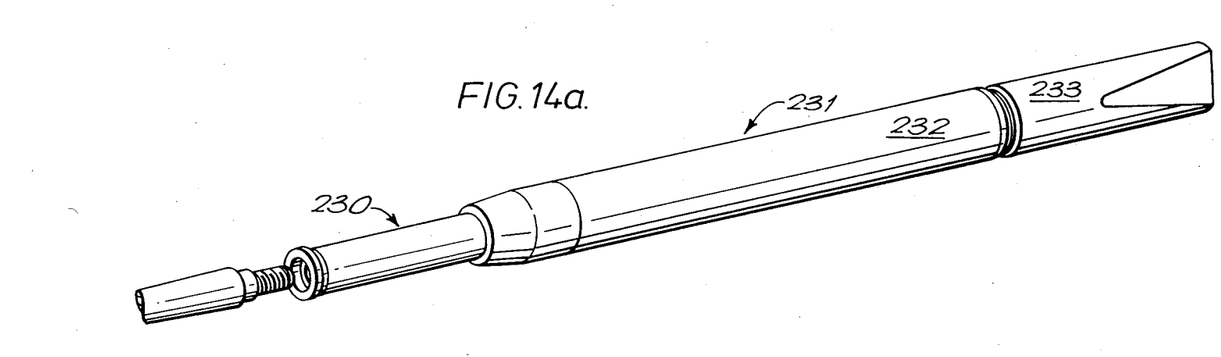
FIGS. 14a to 14e show the embodiment also generally described above in which the lock comprises a compressible split collet mounted inside the receiving section of the cue (in this case the butt section), the receiving section being divided into two components relative rotation of which operates the lock.
Figure 14B:
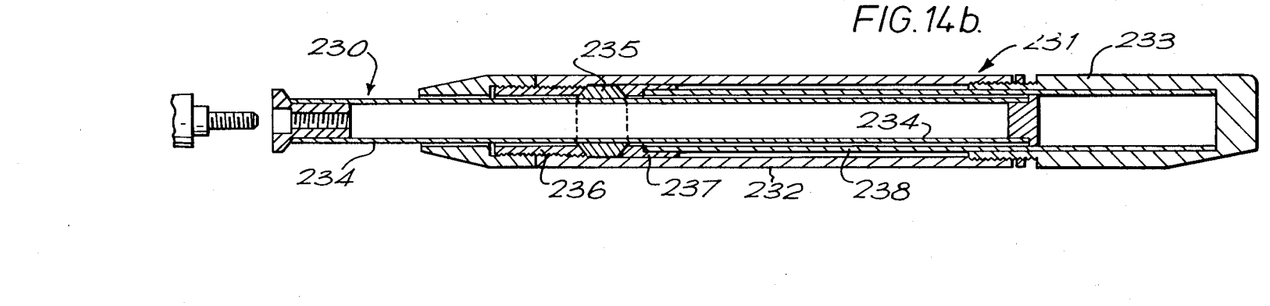
Figure 14C:
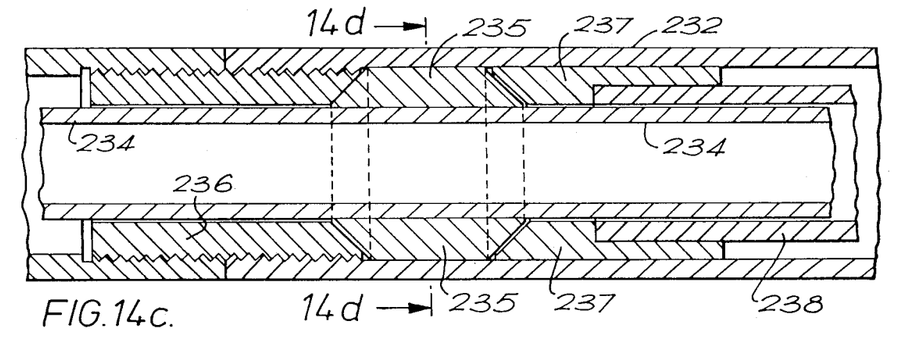
Figure 14D:
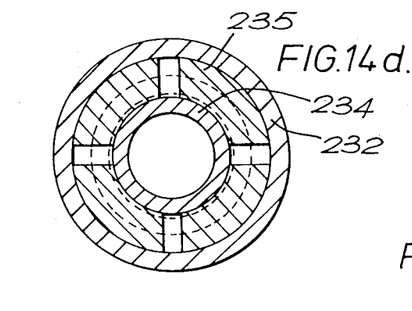
Figure 14E:
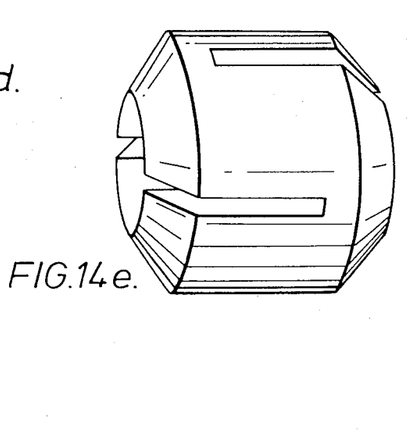

FIGS. 14a to 14d show a further embodiment of the invention in which the central section shown generally at 230 is received in the butt section, shown generally at 231, and the latter is split into two components 232 and 233 which are threadably engaged. As can be seen from FIG. 14b the central section comprises a tube 234 extending into the forward component 232 of the butt section through the internal bore of a cylindrical split collet 235. This collet 235 and its associated components together form the lock and are shown in more detail in axial and diametric cross-sections respectively in FIGS. 14c and 14d, FIG. 14e showing the collet alone. Inside tube 232 is a stop member 236 with an internal conical face at its rear end. A sleeve 237 is slideably received in the bore of tube 232 and has a forwardly facing internal conical face at its forward end. Engaged in an annular recess in the sleeve 237 is a tube 238 integral with the rear component 233 of the butt section. Between the opposed conical faces of the stop 236 and the sleeve 237 is the collet 235, which in this embodiment has externally bevelled ends.

The forward and rear components of the butt section, 231 and 233 respectively, are threadably engaged so that relative rotation of these components brings about axial movement. Such relative movement to bring the two components together brings the internal conical faces of the stop member 236 and the sleeve 237 into engagement with the collet 235 and cause it to contract upon the external surface of the tube 234 integral with the central section 230, thus preventing or restraining telescopic movement of the two sections of the cue. Again, a quick twist of the rear component of the butt section in the opposite direction releases the pressure on the cylindrical element and enables the cue to be adjusted for length according to the invention.

Figure 12E:
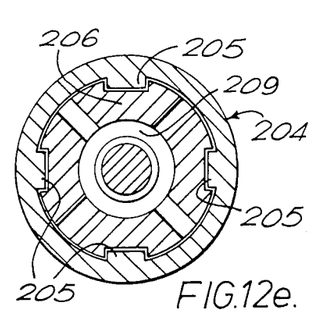
Figure 12F:
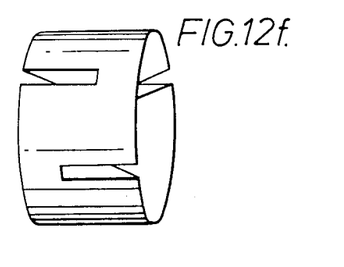
Figure 13A:
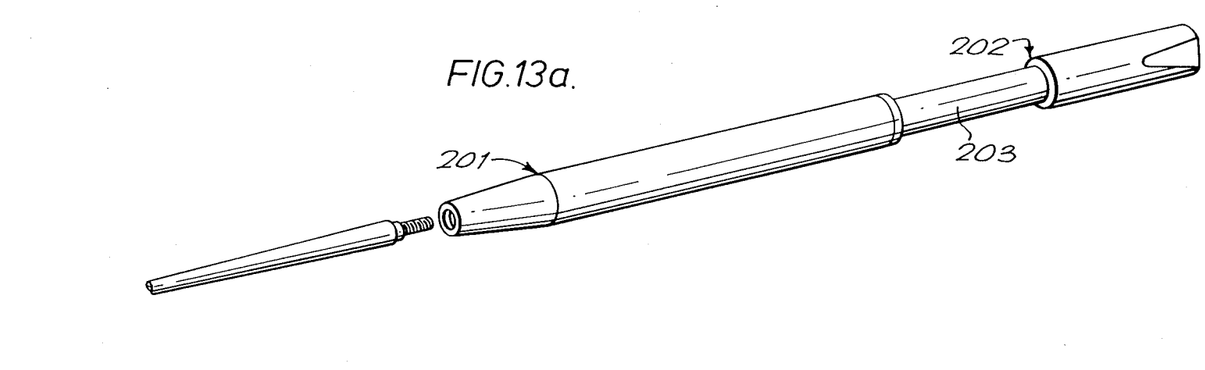
FIGS. 13a to 13e show, in various views, a different form of the same embodiment in which the lock is mounted on the forward end of the butt section, which is in this case the received section.
Figure 13B:
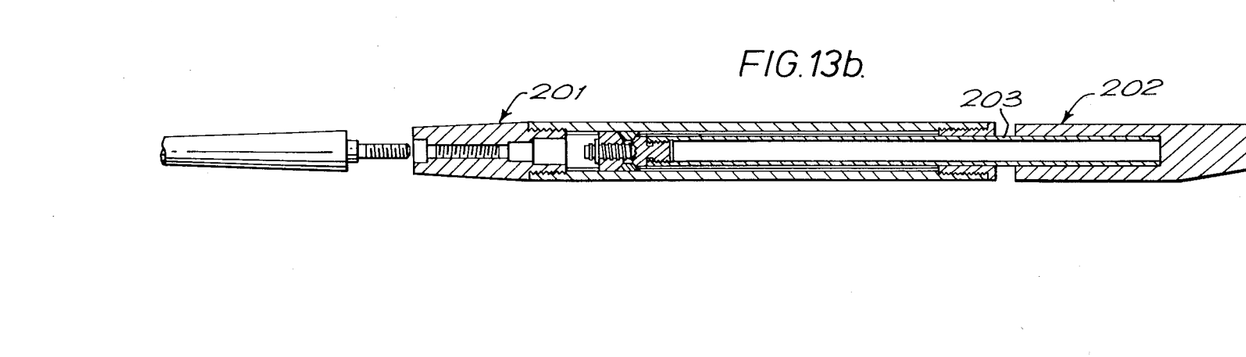
Figure 13C:
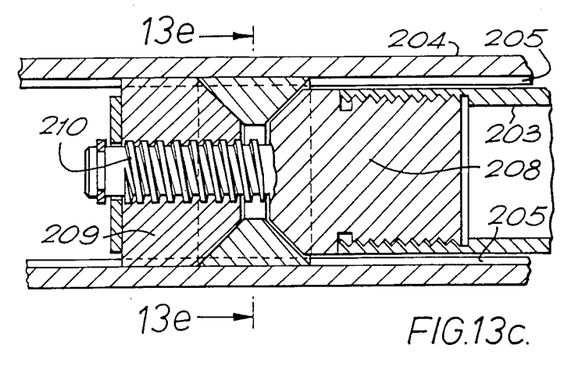
Figures 13D, 13E:
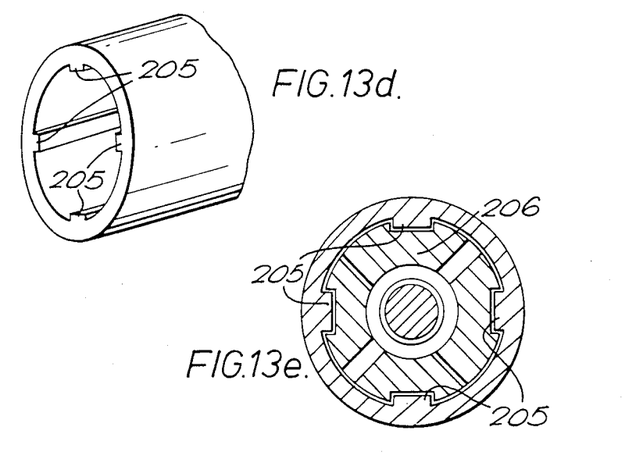

Instead of a single slotted split collet, as illustrated in FIGS. 12f and 12e, a plurality of separate collets may be used, for example two hemicylindrical collets.

Although many materials can be used to give cues according to the invention the desired handle, appearance and balance, as well as mechanical strength, it has been found especially suitable to make the working parts of aluminium or one of its alloys. The grip however can be made of wood, and the cue tip in the traditional wood with a threaded end for assembly, as in existing cue tips. For serious players, balance is as important as appearance. The cue, according to the invention, can be supplied with tips of various lengths to give a greater range of available lengths than the inbuilt range of the sliding telescopic adjustment of the cue itself.

The invention is not limited to the embodiments specifically described and many variations are possible within the overall scope of the invention.

We claim:

1. A cue the length of which is continuously telescopically adjustable, comprising:
   a central section having an outer surface;
   a butt section telescopically receiving said central section, said butt section comprising a main part and a grip part having a forward end, said grip part being co-axially engaged with said main part and extending forwardly within said main part; and
   a lock adapted to fix the relative axial positions of said central and butt sections by frictional engagement, said lock comprising at least one externally bevelled collet disposed around said central section within said main part and abutting the forward end of said grip part;
   said main and grip parts being threadably engaged; and
   means co-operating with said collet such that relative rotation of said main and grip parts in one sense compresses said collet and brings the said collet into frictional engagement with the outer surface of said central section thus preventing relative axial movement of said central and butt sections and relative rotation in an opposite sense disengages said collet from the said surface and permits relative axial movement of said central butt and sections and thereby permits adjustment of the length of the cue.

2. A cue the length of which is continuously telescopically adjustable comprising:
   a central section;
   a butt section telescopically receiving said central section, said butt section comprising a tubular main part and a grip part threadably engaging said main part at one end of said main part and having a tubular extension extending forwardly within said main part towards an opposite end of said main part, said central section being slidably received in said tubular extension, said tubular extension having a forward end; and
   a lock to fix the relative axial positions of said central and butt sections by frictional engagement and comprising at least one externally bevelled collet disposed around said central section within said main part, and means co-operating with said collet such that relative rotation of said main and grip parts in one sense compresses said collet into locking frictional engagement with said central section to secure said central section relative to said butt section to fix the length of said cue, and relative rotation of said main and grip parts in an opposite sense releases said locking frictional engagement to permit relative movement of said central and butt sections to adjust the length of said cue.

3. A telescopic cue the length of which is infinitely adjustable between two end positions corresponding to maximum and minimum cue lengths, comprising:
   a butt section having a main part threadably engaged with a grip part;
   a central section telescopically received within said butt section for adjusting said cue length; and
   a lock disposed within said butt section for securing said central section relative to said butt section to fix said cue length, said lock comprising at least one externally bevelled collet disposed around said central section between first and second relatively movable abutments, and said grip part having a forward extension within said main part operable upon relative rotation of said main and grip parts in one sense to urge one of said abutments towards the other to compress said collet into locking frictional engagement with said central section to secure said central section relative to said butt section to fix said cue length, and upon relative rotation of said main and grip parts in an opposite sense to release said locking frictional engagement to permit relative movement of said central and butt sections to adjust said cue length.

4. A cue according to claim 3, wherein:
   each said abutment has a respective internal conical end face corresponding with said externally bevelled collet.

5. A cue according to claim 3, wherein:
   said collet has two opposite ends and is formed with a plurality of slots extending axially from each said end with the slots from one said end alternating with the slots from the other said end in the circumferential direction of said collet.

6. A cue according to claim 3, wherein:
   said first abutment is associated with said main part and said second abutment is associated with said forward extension of said grip part.

7. A cue according to claim 6, wherein:
   said first abutment comprises a fixed stop member and said second abutment comprises a sleeve slidably received within said main part and axially movable relative to said stop member upon relative rotation of said main and grip parts.

8. A cue according to claim 7, wherein:
   said sleeve is mounted on said forward extension of said grip part.

9. A cue according to claim 3, wherein:
   said forward extension of said grip part comprises a tube in which said central section is slidably received.

10. A cue according to claim 3, wherein:
    said central section further includes means for mounting a cue tip.

* * * * *